United States Patent [19]

Hart

[11] 4,024,537
[45] May 17, 1977

[54] DOPPLER-RADAR, PROJECTED TERRAIN-CLEARANCE SYSTEM

[76] Inventor: Gerald E. Hart, P.O. Box 127 LOW, Locust Grove, Va. 22508

[22] Filed: May 24, 1976

[21] Appl. No.: 689,694

[52] U.S. Cl. .............................. 343/5 R; 343/7 TA
[51] Int. Cl.² .......................................... G01S 9/22
[58] Field of Search ...................... 343/7 TA, 5 R

[56] References Cited

UNITED STATES PATENTS

| | | | |
|---|---|---|---|
| 3,187,328 | 6/1965 | Vetter | 343/7 TA X |
| 3,553,689 | 1/1971 | Bechtel | 343/7 TA |

Primary Examiner—Maynard R. Wilbur
Assistant Examiner—Richard E. Berger
Attorney, Agent, or Firm—R. S. Sciascia; Philip Schneider; David G. Rasmussen

[57] ABSTRACT

A doppler-radar system for computing terrain clearance of the projected flight path of an aircraft from a maximum-range doppler frequency and a doppler frequency for a known slant range. The apparatus includes a transmitter/receiver, a maximum-range doppler-frequency counter, a slant-range doppler-frequency counter, and a terrain-clearance computer which receives the outputs of the maximum-range and slant-range doppler-frequency counters to compute a depression angle and terrain clearance and provide an output of the terrain clearance to an indicator.

10 Claims, 5 Drawing Figures

DOPPLER-RADAR, PROJECTED TERRAIN-CLEARANCE SYSTEM

STATEMENT OF GOVERNMENT INTEREST

The invention described herein may be manfactured and used by or for the Government of the United States of America for governmental purposes without the payment or any royalties thereon or therefor.

BAGKGROUND OF THE INVENTION

1. Field of the Invention

This invention relates to a doppler-radar system for computing terrain clearance of the projected flight path of an aircraft. More specifically, the invention relates to computation of terrain clearance from a maximum-range doppler frequency and a slant-range doppler frequency for a known slant range.

2. Description of the Prior Art

A pilot needs a warning of an obstacle in his flight path and his terrain clearance twenty to thirty seconds in advance to be able to take corrective action. Accordingly, when traveling at a speed of 600 knots, the pilot must know the terrain clearance of his flight path 4 or 5 miles ahead.

Attempts have been made to determine this information using available doppler-radar systems. One type of doppler-radar obstacle detection system analyzes doppler frequencies to determine if they are varying or constant. This indicates whether there is an obstacle in the flight path but does not provide terrain clearance. Another type doppler-radar system uses a known aircraft altitude and speed together with a doppler frequency measured for a ground point to compute the depression angle between the aircraft flight path and ground point. From this information, the slant range to the ground point is computed. This system displays the relative position and size of protuberances for an aircraft ground track on a PPI type display. However, this system has the disadvantages that aircraft altitude and speed must be known and the system cannot provide information as to size of the object with respect to the height of the aircraft. Both altitude and speed measurements are subject to substantial error.

What is needed is an accurate inexpensive doppler-radar system which can determine terrain clearance at a slant range of about 4 miles independent of aircraft speed.

SUMMARY OF THE INVENTION

The present invention provides an improved doppler-radar system which will compute terrain clearance from the highest doppler frequency measured for a maximum range (hereinafter maximum-range doppler frequency) and the highest doppler frequency measured for a known slant range (hereinafter slant-range doppler frequency) independent of aircraft speed. The apparatus includes a conventional doppler-radar transmitter/receiver which provides signals to a maximum-range doppler-frequency counter and a slant-range doppler-frequency counter. The maximum-range and slant-range doppler frequencies are provided to a terrain-clearance computer which calculates a depression angle between the aircraft flight path and the slant range, and further computes the aircraft terrain clearance from the calculated depression angle.

One object of the present invention is to provide apparatus for obtaining the maximum-range and slant-range doppler frequencies, and computing aircraft terrain clearance from these frequencies independent of aircraft speed.

Another object of the invention is to provide an accurate, inexpensive fixed-tuned filter for use in the maximum-range and slant-range doppler-frequency counters.

DESCRIPTION OF THE PREFERRED EMBODIMENTS

Figure 1:
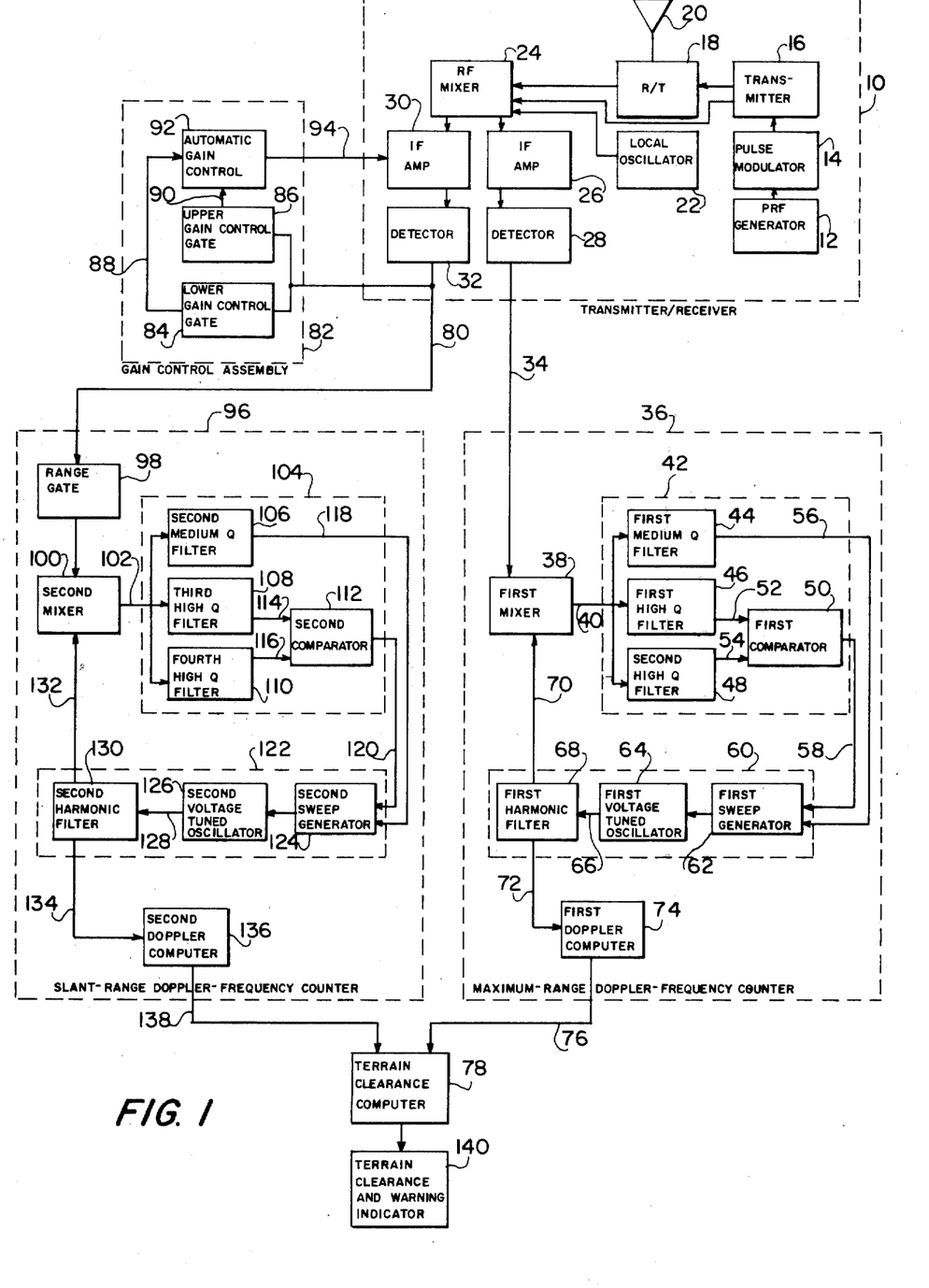
FIG. 1 is a block diagram representation of a doppler-radar system for computing terrain clearance from a maximum-range doppler frequency and a slant-range doppler frequency.

A doppler-radar system for computing terrain clearance of the projected flight path of an aircraft from a maximum-range doppler frequency and a slant-range doppler frequency for a known slant range is outlined in FIG. 1. A conventional pulse-type doppler-radar transmitter/receiver unit 10 operates at L-band, typically 1300 mHz, and a PRF of typically 9524 pulses per second, and includes a conventional PRF generator 12, pulse modulator 14, transmitter 16, R/T unit 18, antenna 20, local oscillator 22, and RF mixer 24. Connected to RF mixer 24 is a maximum-range doppler IF amplifier 26 and its associated detector 28 which has at its output doppler frequencies for all points along the aircraft ground track including the maximum doppler frequency for ground points 15 miles or beyond. Also connected to RF mixer 24 is a slant-range doppler IF amplifier 30 and its associated detector 32 which has at its output all doppler frequencies for ground points of less than 8 miles including the slant-range doppler frequency for a ground point at 4 miles. The output from detector 28 is connected through line 34 to a maximum-range doppler-frequency counter 36 and, specifically, to a first mixer 38 therein. First mixer 38, an up-converter, is connected through line 40 to maximum-range fixed-tuned filter assembly 42. The latter filter assembly 42 includes three fixed-tuned filters of typical value, first medium-Q filter 44 having a resonant frequency of 6597 Hz with a bandwidth of 10 Hz, first high-Q filter 46 having a resonant frequency of 6600 Hz with a 2 Hz bandwidth, second high-Q filter 48 having a resonant frequency of 6601.632 Hz with a 2 Hz band-width, and a first comparator 50. The outputs of filters 46, 48 are connected to comparator 50 through lines 52, 54, respectively. FIlter 44 and comparator 50 are connected via lines 56, 58, respectively, to maximum-range sweeping-oscillator assembly 60 and to first sweep generator 62 therein. The output of first sweep generator 62 is fed to first voltage-tuned-oscillator 64 (VTO) which is connected through line 66 to first harmonic filter 68. First harmonic filter 68 will filter out all harmonic frequencies of first VTO 64 which would include all frequencies above 6945 HZ. To enable the second harmonic to be eliminated the minimum VTO 64 frequency must be greater than one-half the resonant frequency of high-Q filter 48. The output of first harmonic filter 68 is fed through line 70 back to first mixer 38 and through line 72 to first doppler computer 74. First doppler computer 74 is a conventional frequency computer which determines the difference frequency between first VTO 64 and the center frequency, typically 6600.697 Hz, resulting from the automatic-frequency-control (AFC) action of fixed-tuned filter assembly 42. The frequency conputed is the maximum-range doppler frequency which is fed through line 76 to terrain-clearance computer 78 which computes the depression angle between the aircraft flight path and slant-range path and further uses the depression angle to compute the terrain clearance.

Returning to transmitter/receiver 10, the output of detector 32 is connected via line 80 to a gain-control assembly 82 whose purpose is to cause the rejection of doppler-radar returns from beyond 8 miles which would act as second round returns for a 2–4 mile range gate to be described subsequently. The rejection is accomplished by controlling the gain of IF amplifier 30. The output of line 80 is fed to a lower gain-control gate 84 which increases gain when there is a lack of doppler-radar returns from beyond 6 miles. The output of line 80 is also fed to upper gain-control gate 86 which decreases gain when doppler-radar returns appear from beyond 8 miles until the doppler-radar returns disappear. The outputs of lower gain-control gate 84 and upper gain-control gate 86 are fed via lines 88, 90, respectively, to automatic-gain-control 92 which provides feedback through line 94 to IF amplifier 30. Lower gain-control gate 84 insures that doppler-radar returns up to 6 miles are present and upper gain-control gate 86 insures that doppler-radar returns over 8 miles are rejected.

Detector 32 is also connected via line 80 to slant-range doppler-frequency counter 96 and, specifically, to 2–4 mile range gate 98 therein. Slant-range dopplers-frequency counter 96, with the exception of 2–4 mile range gate 98, has identical components to those of maximum-range doppler-frequency counter 36. The output of 2–4 mile range gate 98 is fed to second mixer 100 which, in turn, has its output connected through line 102 to slant-range fixed-tuned filter assembly 104. Filter assembly 104 consists of second medium-Q filter 106 identical to first medium-Q filter 44, third high-Q filter 108 identical to first high-Q filter 46, fourth high-Q filter 110 identical to second high-Q filter 48, and second comparator 112 identical to first comparator 50. The outputs of filters 108, 110 are connected to second comparator 112 via lines 114, 116, respectively. The outputs of filter 106 and comparator 112 are connected via lines 118 and 120, respectively, to slant-range sweeping-oscillator assembly 122 andd, specifically, second sweep generator 124 therein. Second sweep generator 124 is identical to first sweep generator 62. The output of second sweep generator 124 is fed to second voltage-tuned-oscillator (VTO) 126 which is identical to first VTO 64. The output of second VTO 126 is fed via line 128 to second harmonic filter 130 which is identical to first harmonic filter 68.

The output of second harmonic filter 130 is connected via line 132 to second mixer 100 and via line 134 to second doppler computer 136 which is identical to first doppler computer 74. Second doppler computer 136 is connected through line 138 to terrain-clearance computer 78 to assist in the computation of the depression angle, as described previously.

Terrain-clearance computer 78 will provide to terrain clearance and warning indicator 140 an indication of projected terrain clearance at 4 miles, and may, in addition, provide a minimum clearance warning which is triggered whenever the clearance at the 4 mile slant range drops below a selected value or a danger warning when terrain clearance goes to zero.

Figure 2:
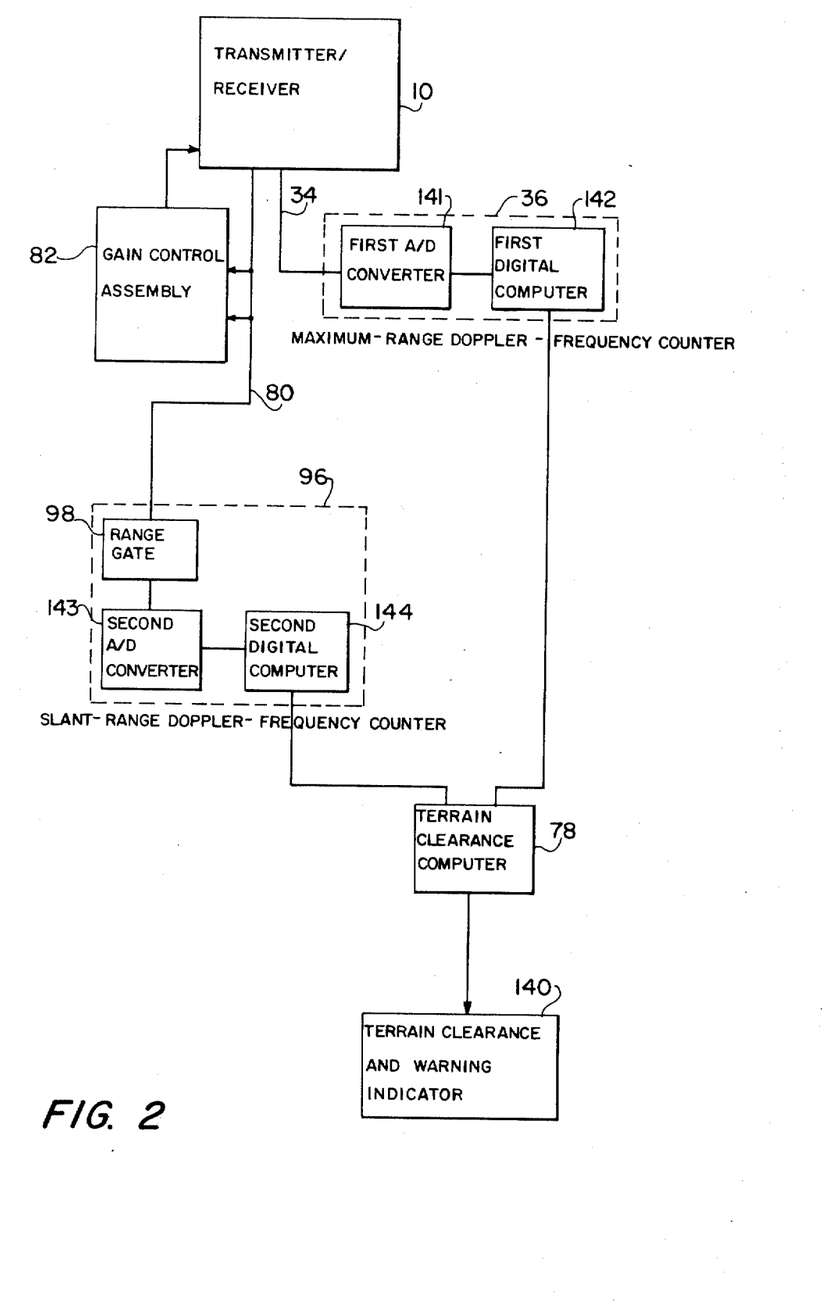
FIG. 2 is a block diagram representation of an alternative doppler-radar system for computing terrain clearance from a maximum-range doppler frequency and a slant-range doppler frequency.

FIG. 2 shows alternative apparatus for computing the same depression angle and terrain clearance as the apparatus of FIG. 1. The apparatus of FIG. 2 includes components identical to those of FIG. 1 as follows: transmitter/receiver 10, transmitter/receiver output lines 34, 80, gain-control assembly 82, terrain-clearance computer 78, and terrain clearance and warning indicator 140. The apparatus of FIG. 2 utilizes a different frequency counting scheme than the apparatus of FIG. 1. In FIG. 2 maximum-range doppler-frequency counter 36 contains a first analog to digital (A/D) converter 141 and a first digital computer 142. First A/D converter 141 digitizes the doppler frequencies received through line 34 and passes them to first digital computer 142 which is programmed to count the highest frequency. This frequency is the maximum-range doppler frequency and is fed to terrain-clearance computer 78. Slant-range doppler frequency counter 96 includes 2–4 mile range gate 98 the same as shown in FIG. 1, a second A/D converter 143 and a second digital computer 144. The doppler frequencies from line 80 are fed through range gate 98 to second A/D converter 143 where they are digitized. Second digital computer 144 receives the digitized frequencies and counts the highest doppler frequency for the slant range. The output is fed to terrain-clearance computer 78 where the depression angle and terrain clearance are computer and the proper signals sent to indicator 140.

Figure 3:
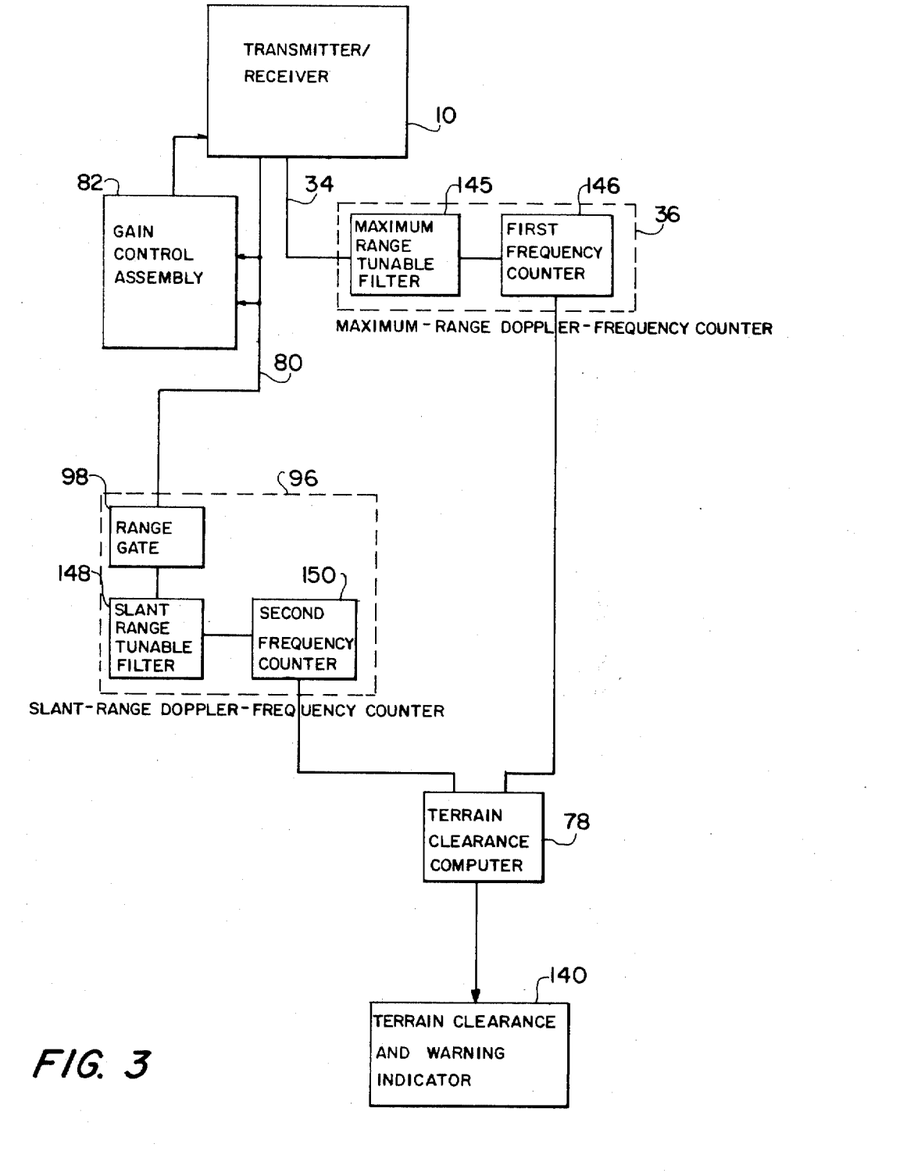
FIG. 3 is a block diagram of a second alternative doppler-radar system for computing terrain clearance from a maximum-range doppler frequency and a slant-range doppler frequency.

FIG. 3 shows a second alternative apparatus for computing the same depression angle and terrain clearance as the apparatus of FIG. 1. The apparatus of FIG. 3 includes components identical to those of FIG. 1 as follows: transmitter/receiver 10, transmitter/receiver output lines 34, 80, gain control assembly 82, terrain-clearance computer 78, and terrain clearance and warning indicator 140. The apparatus of FIG. 3 utilizes a different frequency counting scheme than the apparatus of FIG. 1 or FIG. 2. In FIG. 3 maximum-range doppler-frequency counter 36 contains a maximum-range tunable filter 145 and a first frequency counter 146. The output of transmitter/receiver 10 is fed through line 34 to maximum-range tunable filter 145 which is a narrowband tunable high-Q filter which scans slowly upward in frequency and feeds its output to frequency counter 146 which counts the doppler frequency directly and stores the highest frequency counted. This frequency is the maximum-range doppler frequency and is fed to terrain-clearance computer 78. Slant-Range Doppler-Frequency Counter 96 contains a 2–4 mile range gate 98 the same as shown in FIG. 1, a slant-range tunable filter 148 and a second frequency counter 150. The output of transmitter/receiver 10 passing through line 80 is received at 2–4 mile range gate 98. The output of range gate 98 is fed to slant-range tunable filter 148 which is a narrowband tunable high-Q filter which scans slowly upward in frequency and feeds its output to frequency counter 150 which counts the highest doppler frequency for the slant range. This output is fed to terrain-clearance computer 78 where the depression angle and terrain clearance are computed and the proper signals set to indicator 140.

Figure 4:
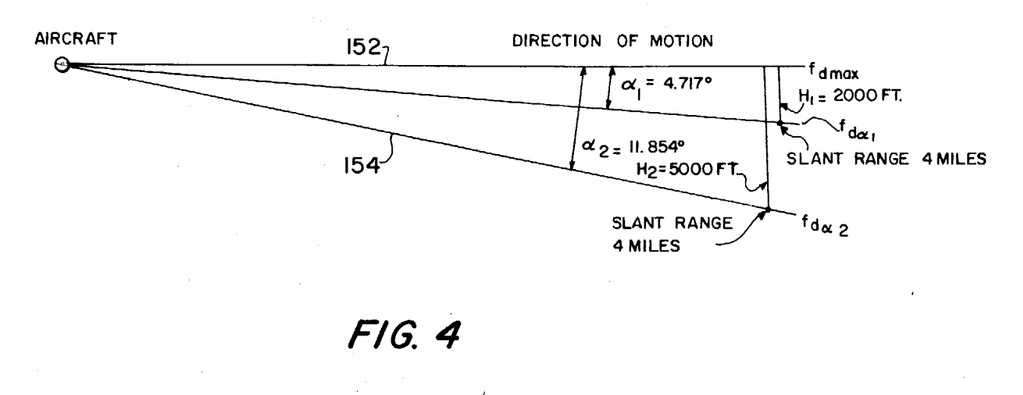
FIG. 4 is a diagrammatic view showing the geometric relationship of the parameters necessary to compute terrain clearance.

FIG. 4 shows the geometric relationship of the parameters necessary to compute terrain clearance. Terrain clearance at a particular range is a function of the depression angle between a level flight path parallel to the ground and the path to a reflection point on the ground. Line 152 represents a level flight path parallel to the earth and line 154 represents a path to a ground reflection point at a slant range of 4 miles. The depression angle $\alpha 2$, between lines 152 and 154, can be shown to be the angle whose cosine is the ratio of the doppler frequency from ground reflections at the slant range ($f_{d\alpha_2}$) and the doppler frequency for the flight path ($f_{dmax}$).

$$\cos \alpha_2 = (f_{d\alpha_2}/f_{dmax})$$

Depression angle $\alpha_1$, is computed similarly using $f_{d\alpha_1}$. The doppler frequency for the flight path is an approximation of the doppler frequency for ground reflections at 15 miles or beyond, since the latter ground reflections at 15 miles or beyond have a maximum value which is nearly the same as for the flight path. This approximation is used because it is difficult to directly measure a doppler frequency along the flight path and the error involved is insignificant. A true measurement of $f_{dmax}$ may be accomplished only when there is an object in the flight path. The terrain clearance H is calculated by the relationship:

$$H = (\text{slant range})(\sin\alpha)$$

The depression angle $\alpha_2$ computed from the values of $f_{max}$ and $f_{d\alpha_2}$ is 11.854° which results in a terrain clearance value $H_2$ equal to 5000 ft for a slant range of 4 miles. Depression angle $\alpha_1$, computed from $f_{dmax}$ and $f_{d\alpha_1}$, has a value of 4.717° and results in a terrain clearance $H_1$ equal to 2000 ft for a slant range of 4 miles.

Figure 5:
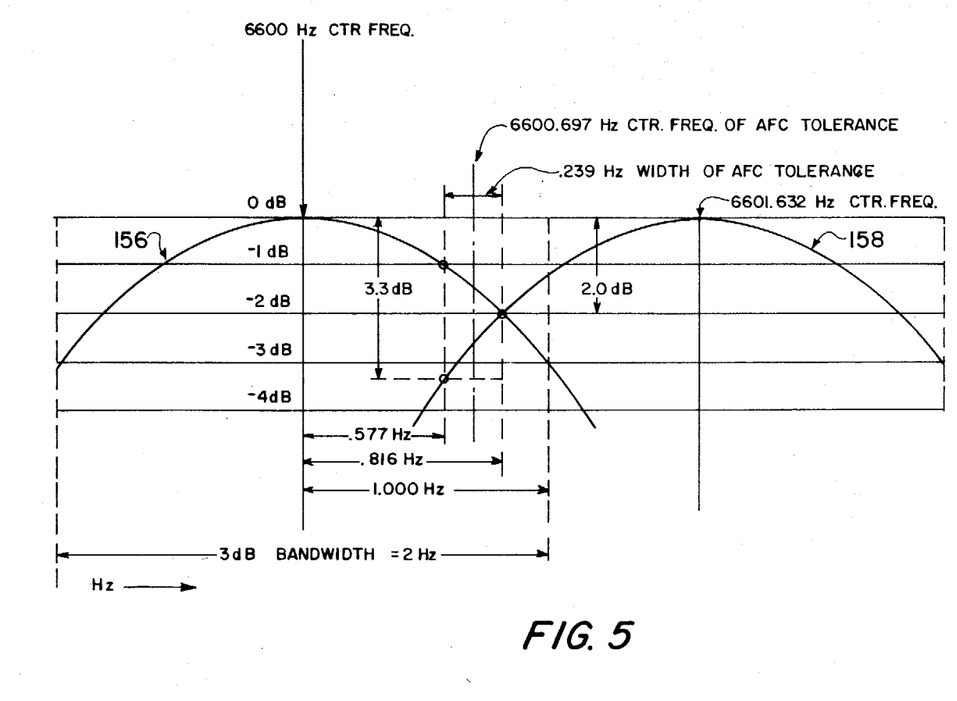
FIG. 5 is a diagrammatic view showing the response curves of the maximum-range fixed-tuned filter and slant-range fixed-tuned filter of FIG. 1 as utilized for accomplishing automatic-frequency-control.

FIG. 5 shows response curves which are identical for both the maximum-range fixed-tuned filter 42 and slant-range fixed-tuned filter 104. Response curves 156, 158 are the response curves for first and second high-Q filters 46 and 48 of maximum-range fixed-tuned filter 42 and identically, the response curves for third and fourth high-Q filters 108 and 110 of slant-range fixed-tuned filter 104. For purposes of illustration the response curves will be described only in relation to first and second high-Q filters 46 and 48, respectively. The frequency 6600.816 Hz, at which response curves 156, 158 intersect is the frequency at which second high-Q filter 48 (curve 158) reaches a level 2-db below the maximum response of first high-Q filter 46 (curve 156). This frequency represents the upper edge of the .239 Hz AFC tolerance band. The lower edge of the AFC tolerance is at 6600.577 Hz where the response of second high-Q filter 48 reaches a level 3.3-db below the maximum response of first high-Q filter 46. The center frequency 6600.697 Hz, of the AFC tolerance is the center or lock-on frequency for the overall maximum-range fixed-tuned filter 42. This will similarly be the lock-on frequency of slant-range fixed-tuned filter 104.

In operation, a pulsed doppler-radar return consisting of doppler-radar returns from all points along the ground track of the aircraft is received at tramsmitter/receiver 10 where doppler frequencies are produced and passed to IF amplifiers 26, 30, respectively, therein. The output of IF amplifier 26 is fed to detector 28, which has an output consisting of doppler frequencies for all points along the aircraft ground track including the maximum doppler frequency for ground points 15 miles or beyond. The output of detector 28 is fed through line 34 to maximum-range doppler-frequency counter 36 whose purpose is to count the doppler frequencies and determine the maximum doppler frequency. Maximum-range doppler-frequency 36 does not directly count the doppler frequency but instead indirectly counts the maximum frequency by calculating the difference between the center frequency for maximum-range fixed-tuned filter 42 and the frequency of first voltage-tuned-oscillator 64, as will be described subsequently. Greater accuracy is achieved in this manner. In general, to count the maximum doppler frequency the output of sweeping voltage-tuned-oscillator 64 is mixed with the incoming doppler frequencies in mixer 38. As VTO 64 sweeps upward the sum frequency of mixer 38 will increase and reach a point where maximum-range fixed-tuned filter 42 locks on the frequency at 6600.697 Hz. The difference between the 6600.697 Hz center frequency and the frequency at which VTO 64 is at when lock-on occurs is computed in first doppler computer 74. The difference frequency is the doppler frequency for the maximum range beyond 15 miles. More specifically, mixer 38 receives the incoming doppler frequencies and the sweeping frequency from VTO 64 through harmonic filter 68. The doppler signal and sweeping frequency are mixed in first mixer 38 to obtain a sum frequency which is fed through line 40 to first medium-Q filter 44, first high-Q filter 46, and second high-Q filter 48. As the sweeping frequency increases, the sum frequency of mixer 38 increases until it reaches the resonant frequency of first medium-Q filter 44 at 6597 Hz. At this point, first medium-Q filter 44 provides an output through line 56 to sweep generator 62 where the sweep rate will shift from a fast sweep to a slow sweep. This will cause the sum frequency of mixer 36 to increase slowly from 6597 Hz to approximately 6600 Hz where the resonant frequencies of first and second high-Q filters lie at 6600 Hz and 6601.632 Hz, respectively. As 6600 Hz is approached the outputs of filter 46, 48 are fed to comparator 50 where the outputs are compared. This comparison accomplishes automatic-frequency-control in the following manner. As the frequency slowly increases, the output of second high-Q filter 46 reaches a level 2-db below the maximum output of first high-Q filter 46 at 6600.816 Hz. At this point, comparator 50 sends an output to first sweep generator 62 to stop the sweep and reverse it. As the sweep slowly reduces the frequency of VTO 64 the output of second high-Q filter 48 declines until it is reduced to 3.3db lower than the maximum output of first high-Q filter 46 at 6600.577 Hz. At this point, comparator 50 sends an output to sweep generator 62 to reverse the sweep again and repeat the automatic-frequency-control cycle. As is shown in FIG. 5 the automatic-frequency-control locks VTO 64 into an output frequency that will result in a sum frequency variation of only .239 Hz.

This narrow tolerance is essential in order to avoid unreasonable error in terrain clearance computation. The output of VTO 64 in its locked state is fed through harmonic filter 68 to first doppler computer 74 where the difference between the frequency of VTO 64 and the center frequency of the AFC action 6600.697 Hz is computed. This difference is the doppler frequency for the maximum range, and is fed to terrain-clearance computer 78.

The doppler-radar return received at transmitter-receiver 10 is also passed to IF amplifier 30. IF amplifier 30 operates in conjunction with gain-control assembly 82 to reject all doppler radar returns from beyond an 8 mile range and thus prevent second round reflections which would otherwise occur when using a typical PRF of 9524 pulses per second. The output of IF amplifier 30 is fed to detector 32 which feeds an output through line 80 to lower gain-control gate 84 and upper gain-control gate 86 of gain-control assembly 82. If doppler-radar returns from beyond 8 miles are received, upper-gain control gate 86 causes the gain of automatic-gain-control 92 to decrease until the returns from beyond 8 miles disappear. If doppler-radar returns from the range between 6 and 8 miles are received, no action is taken. If no doppler-radar returns are received from beyond a range of 6 miles lower gain-control gate 84 causes the gain to increase. In summary, lower gain-control gate 84 insures that doppler frequencies from 6 miles or more are present while upper gain-control gate 86 rejects all doppler frequencies from beyond 8 miles. The output of automatic-gain-control 92 is feedback to IF amplifier 30.

The output of detector 32, as modified by the gain-control loop, is fed to slant-range doppler-frequency counter 96 which counts the maximum doppler frequency for the slant range of 4 miles. The 2–4 mile range gate 98 receives the output of detector 32 and excludes any doppler-radar returns from greater than 4 miles or less than 2 miles. The remaining doppler frequencies are fed to a second mixer 100. The circuit of slant-range doppler-frequency counter 96, beginning at second mixer 100, is identical in components and operation to the circuit of maximum-range doppler-frequency counter 36. Therefore, it is unnecessary to provide a description of the circuit. It is sufficient to state that the maximum slant-range doppler frequency is computed in second doppler computer 136 and passed through line 138 to terrain clearance computer 78.

In terrain-clearance computer 78, the depression angle is computed from the maximum doppler frequency for the range beyond 15 miles and the maximum doppler frequency for the 4 miles slant range. The terrain clearance is then calculated from the computed depression angle and the 4 mile slant range. The terrain clearance is then fed to terrain clearance and warning indicator 140 for display. Additionally, terrain-clearance computer 78 may provide a warning when terrain clearance drops below a pre-set value and a danger warning when terrain clearance drops to zero.

In FIGS. 2 and 3 alternative embodiments for computing terrain clearance are shown. These embodiments operate identically to that of FIG. 1 except for the method of counting doppler frequencies. The A/D converters and digital computers of FIG. 2, and the tunable filters and frequency counters of FIG. 3 count doppler frequencies directly as opposed to the indirect counting of doppler frequencies by the embodiment of FIG. 1.

A typical application for the terrain clearance and warning system described herein would be an installation in a conventional commercial jet aircraft which has a weather radar in the nose. The antenna for the proposed system would consist of fixed "invisible" dipoles placed in front of the weather radar antenna and designed to produce a horizontal beamwidth of approximately 40° (to accommodate crab angles) and a vertical beamwidth of 30° C. The invisible dipoles would be designed to produce no appreciable degradation to the weather radar. A conventional L-band radar with peak power of 2 to 3 kw and pulse lengths of 8 sec should provide ample signals out to 20 miles or beyond. This device would prove especially valuable when approaching an airfield surrounded by hills or mountains during periods of low visibility.

Obviously many modifications and variations of the present invention are possible in light of the above teachings. It is therefore to be understood that within the scope of the appended claims the invention may be practiced otherwise than as specifically described.

What is claimed and desired to be secured by Letters Patend of the United States is:

1. A pulsed doppler-radar system, including a doppler-radar transmitter/receiver, for computing terrain clearance of the projected flight path of an aircraft comprising:
   maximum-range doppler-frequency counter means receiving an output from said transmitter/receiver for counting the highest doppler frequency for a maximum range;
   slant-range doppler-frequency counter means receiving an output from said transmitter/receiver for counting the highest doppler frequency for a known slant-range;
   terrain-clearance computer means, receiving the outputs of said maximum-range doppler-frequency counter means and said slant-range doppler-frequency counter means, for computing a depression angle and terrain clearance information.

2. The apparatus of claim 1 including:
   an indicator receiving the output of said terrain clearance computer; and
   a gain-control assembly receiving an output from said transmitter/receiver and providing a feedback signal to said transmitter/receiver.

3. The apparatus of claim 1 including:
   a first A/D converter and a first digital computer both in said maximum-range doppler-frequency counter, said first A/D converter receiving an output from said transmitter/receiver, said first digital computer receiving the output of said first A/D converter and providing an output to said terrain-clearance computer; and
   a range gate, a second A/D converter and a second digital computer all in said slant/range doppler-frequency counter, said range gate receiving the output from said transmitter/receiver and providing an output to said second A/D converter which provides an output to said second digital computer, said second digital computer providing an output to said terrain-clearance computer.

4. The apparatus of claim 1 including:
   a maximum-range tunable filter and a first frequency counter both in said maximum-range doppler-frequency counter, said maximum-range tunable filter receiving an output from said transmitter/receiver, said first frequency counter receiving the output of said maximum-range tunable filter and providing an output to said terrain-clearance computer;

a range gate, a slant-range tunable filter and a second frequency counter all in said slant-range doppler-frequency counter, said range gate receiving the output of said transmitter/receiver, and providing an output to said slant-range tunable filter, said second frequency counter receiving the output of said slant range tunable filter and providing an output to said terrain-clearance computer.

5. The apparatus of claim 1 in which said maximum-range doppler-frequency counter means includes:
a first mixer receiving an output from said transmitter/receiver;
a maximum-range fixed-tuned filter receiving the output of said first mixer;
a maximum-range sweeping oscillator assembly receiving the output of said maximum-range fixed-tuned filter; and
a first doppler computer receiving the output of said maximum-range sweeping oscillator assembly and providing an output to said terrain-clearance computer.

6. The apparatus of claim 5 in which said slant-range doppler-frequency counter means includes:
a range gate receiving the output of said transmitter-receiver;
a second mixer receiving an output from said range gate;
a slant-range fixed-tuned filter receiving the output of said second mixer;
a slant-range sweeping oscillator assembly receiving the output of said slant-range fixed-tuned-filter; and
a second doppler computer receiving the output of said slant-range sweeping oscillator assembly and providing an output to said terrain-clearance computer.

7. The apparatus of claim 6 including:
a gain-control assembly receiving an output from said transmitter/receiver and providing a feedback signal to said transmitter/receiver.

8. The gain-control assembly of claim 7 including:
an automatic-gain-control producing a feedback signal to said transmitter/receiver;
an upper gain-control gate receiving the output of said transmitter/receiver and providing a signal to said automatic-gain-control; and
a lower gain-control gate receiving the output of said transmitter/receiver and providing a signal to said automatic-gain-control.

9. The maximum-range fixed-tuned filter of claim 8 which includes:
a first medium-Q filter receiving the output of said first mixer and providing an output to said maximum-range sweeping oscillator;
a first high-Q filter receiving the output of said first mixer;
a second high-Q filter receiving the output of said first mixer; and
a first comparator receiving the outputs of said first and second high-Q filters and providing an output to said maximum-range sweeping oscillator.

10. The slant-range fixed-tuned filter of claim 9 which includes:
a second medium-Q filter receiving the output of said second mixer and providing an output to said slant-range sweeping oscillator;
a third high-Q filter receiving the output of said second mixer;
a fourth high-Q filter receiving the output of said second mixer; and
a second comparator receiving the outputs of said third and fourth high-Q filters and providing an output to said slant-range sweeping oscillator.

* * * * *